United States Patent [19]

Ross et al.

[11] Patent Number: 5,165,829
[45] Date of Patent: Nov. 24, 1992

[54] END-EFFECTOR APPARATUS

[75] Inventors: Christopher A. Ross, University City; David K. Lewison, St. Charles, both of Mo.

[73] Assignee: McDonnell Douglas Corporation, St. Louis, Mo.

[21] Appl. No.: 790,762

[22] Filed: Nov. 12, 1991

[51] Int. Cl.$^5$ .............................................. B23C 1/06
[52] U.S. Cl. ................................. 409/125; 409/193; 901/30; 901/41
[58] Field of Search ...................... 483/901; 29/26 A; 409/125, 130, 193, 194; 901/30, 41

[56] References Cited
U.S. PATENT DOCUMENTS

| | | | |
|---|---|---|---|
| 4,281,447 | 8/1981 | Miller et al. | 901/30 |
| 4,338,052 | 7/1982 | Lockett | 901/41 |
| 4,637,775 | 1/1987 | Kato | 901/41 |

Primary Examiner—Daniel W. Howell
Attorney, Agent, or Firm—Timothy H. Courson; Guy R. Gosnell; Benjamin Hudson, Jr.

[57] ABSTRACT

An end-effector apparatus, used in combination with a machining device and robotic arm, for use in template-guided robotic machining a workpiece. The end-effector apparatus includes a holding means which holds a guide bushing against the machining template in a consistent orientation with a constant force independent of the orientation of the end-effector apparatus. The end-effector apparatus further includes two separate means for translational travel of the machining device. This translational travel allows the machining device cutting element to controllably follow substantial contour changes along the periphery of the template with a minimal number of spatial coordinates required to be programmed within an interfacing computer.

12 Claims, 3 Drawing Sheets

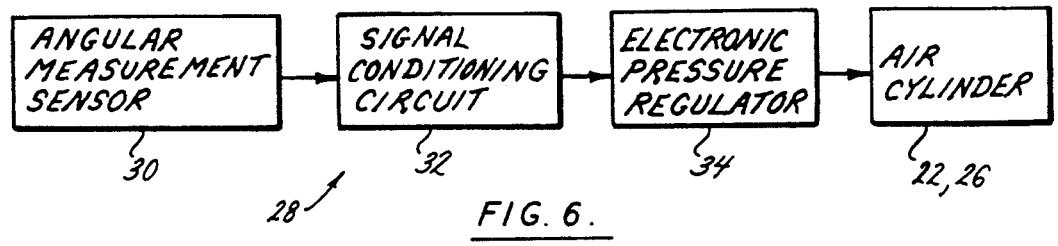
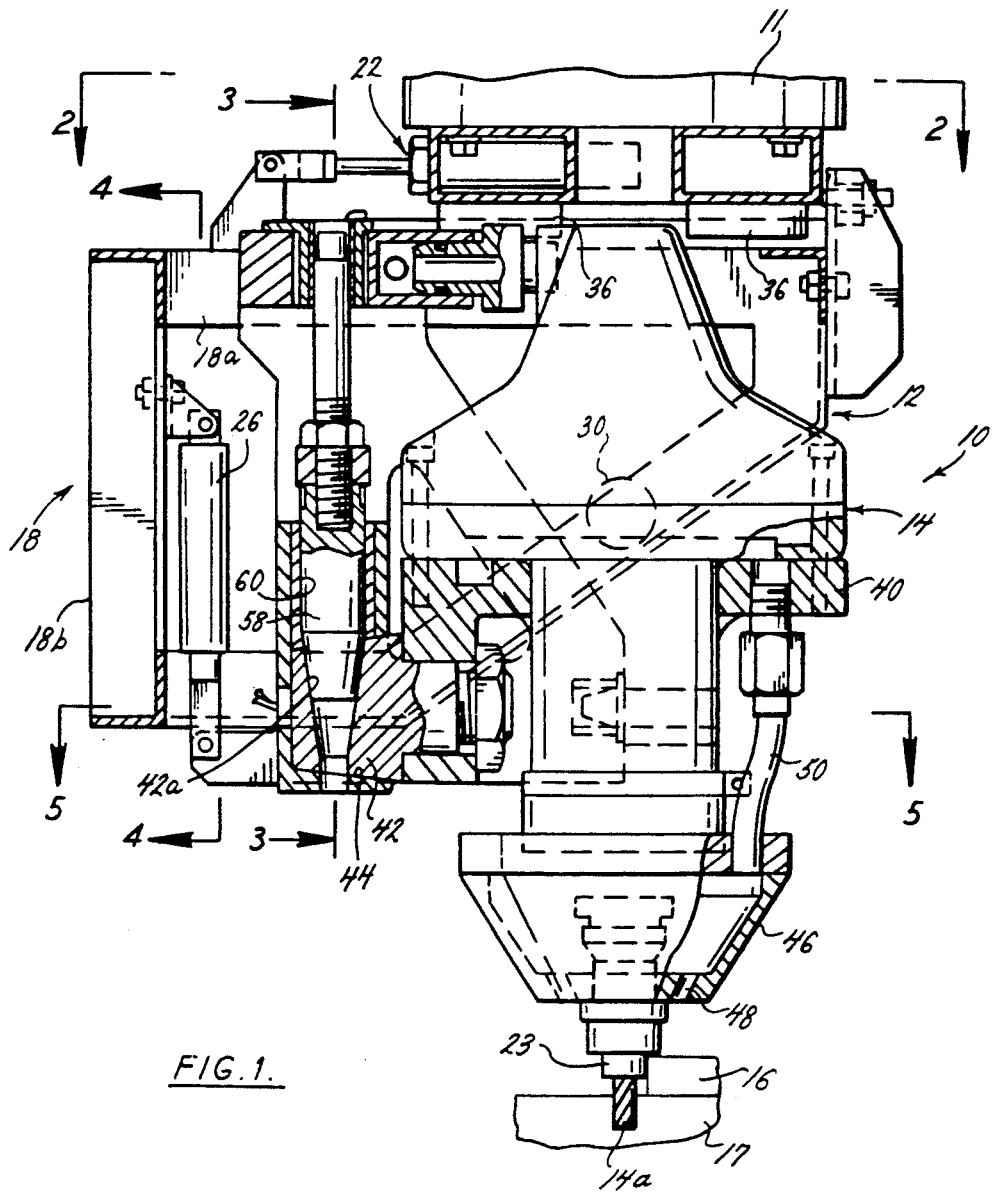

END-EFFECTOR APPARATUS

BACKGROUND OF THE INVENTION

The present invention generally relates to an end-effector apparatus which is used in conjunction with a robotic arm and a template-guided machining device such as a router. More particularly, the present invention relates to an end-effector apparatus which applies a constant force between the template and a machining device guide bushing.

In modern robotic machining processes, it is desirable to maintain a constant force between the machining device guide bushing and the machining template by means of an end-effector apparatus. The end-effector, an apparatus well known to those skilled in the art, serves as a "hand" for the robot and attempts to optimally position and orient the machining device orthogonally to the surface of the template and workpiece; it applies a constant force to the template and aids in consistently machining parts of the same size and shape. If the end-effector apparatus applies a variable force between the guide bushing and the machining template, unnecessary template wear and a decrease in machine performance can result, thereby decreasing the life of the robot. Additionally, the quality of the surface finish on the machined edge of the workpiece will deteriorate. Such a variable force is typically caused by the variance in the effects of gravitational forces upon the machining device as its position varies in space.

It would be desirable to provide an end-effector apparatus which: (1) provides a constant, orthogonally positioned force to the edge of a template, (2) provides linear two-axis movement for the machining device in order for the cutting element to follow a template outline, (3) requires fewer points for computer programming, and (4) allows for rapid replacement of machining devices.

SUMMARY OF THE INVENTION

The end-effector apparatus of the present invention is an integral part of a template guided robotic machining apparatus and is used in conjunction with a machining device in production manufacturing of a workpiece.

The end-effector apparatus includes a means for holding a guide bushing against the template with constant force at any orientation of the end-effector apparatus and machining device. In the preferred embodiment, the holding means consist of two pairs of single acting air cylinders and their control circuits. The first pair of single acting air cylinders applies a force perpendicular to the longitudinal axis of the machining device cutting element, while the second pair of single acting air cylinders applies a force parallel to the longitudinal axis of the cutting element. Each pair of air cylinders has a control circuit which aids in regulating and adjusting the force applied by the cylinders in each respective direction when the end-effector apparatus changes orientation.

Further included in the end-effector apparatus of the present invention are first and second means for translational movement of the machining device in the directions parallel and perpendicular to the longitudinal axis of the machining device cutting element, respectively. In the preferred embodiment, the first movement means is used in conjunction with the first pair of single acting air cylinders and the second movement means is used in conjunction with the second pair of single acting air cylinders. Each movement means includes a pair of linear bearings which provide linear travel to the machining device.

When the holding means is used in conjunction with the first and second means for translational movement, constant force is effectively applied between the guide bushing and template at any orientation of the end-effector apparatus, and the machining device cutting element controllably follows any substantial contour changes around the periphery of the template.

The end-effector apparatus of the present invention described therefore provides improved quality to the machined edge of the workpiece while increasing the life of the robot. Operator time is utilized more efficiently because the controllable travel of the machining device cutting element decreases the number of spatial coordinates which must be programmed into the interfacing computer. Additionally, manual replacement of machining devices is no longer necessary with use of the end-effector apparatus of the present invention. Accordingly, the present invention increases quality and efficiency for production manufacturing of a workpiece while at the same time decreasing production costs.

BRIEF DESCRIPTION OF THE DRAWINGS

FIG. 1 is a detailed side view of the end-effector apparatus of the present invention holding a modified machining device;

FIG. 6 is a block diagram for generally illustrating two separate control circuits of the end-effector apparatus.

DETAILED DESCRIPTION OF THE PREFERRED EMBODIMENT

Figure 2:
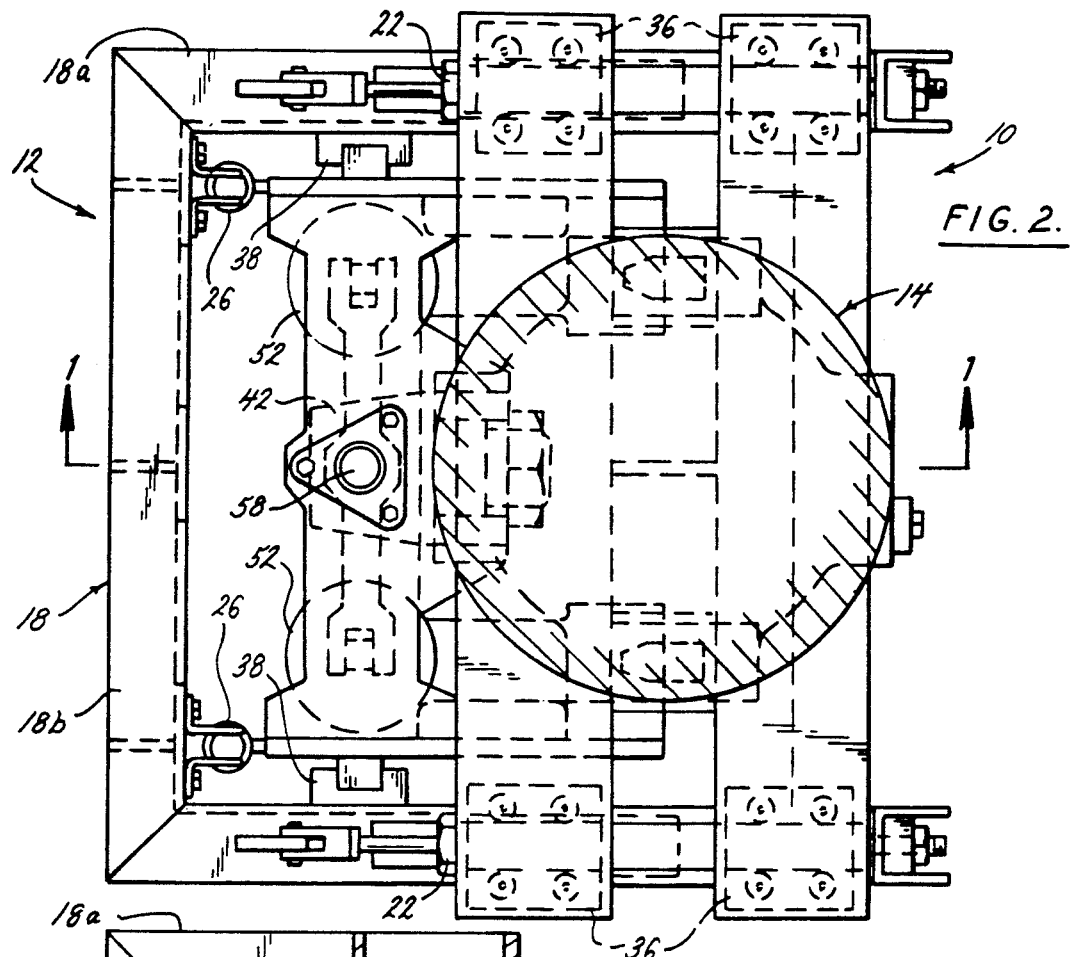
FIG. 2 is a top view of the end-effector apparatus for more fully illustrating the novel features of the present invention.

In FIGS. 1-6, there is shown a preferred embodiment of the present invention. Referring to FIG. 1, a robotic machining apparatus 10 generally consists of a robotic arm 11, an end-effector apparatus 12, and a machining device 14. Machining device 14 employs a cutting element 14a and is typically driven by compressed air. End-effector apparatus 12 and machining device 14 are used in conjunction with a template 16 which provides a pattern for machining device 14 to follow while machining a workpiece 17. As is well known to those skilled in the art, an interfacing computer is used in conjunction with devices such as robotic machining apparatus 10 to provide spatial coordinates, corresponding to points in space on workpiece 17 existing on the periphery of template 16. These coordinates are used to position machining device 14 during its operation.

As shown in FIGS. 1 and 2, end-effector apparatus 12 includes a frame 18 having a first side 18a and a second side 18b. Frame 18 is constructed to securely hold and maintain machining device 14 and to provide an effective interface between robotic arm 11 and machining device 14. Robotic arm 11, such as model XR6050HA manufactured by CIMCORP, has the capability to provide machining device 14 with plural axes and angular rotational movement. The details of robotic arm 11 are not shown in detail and do not comprise part of the present invention.

Figure 4:
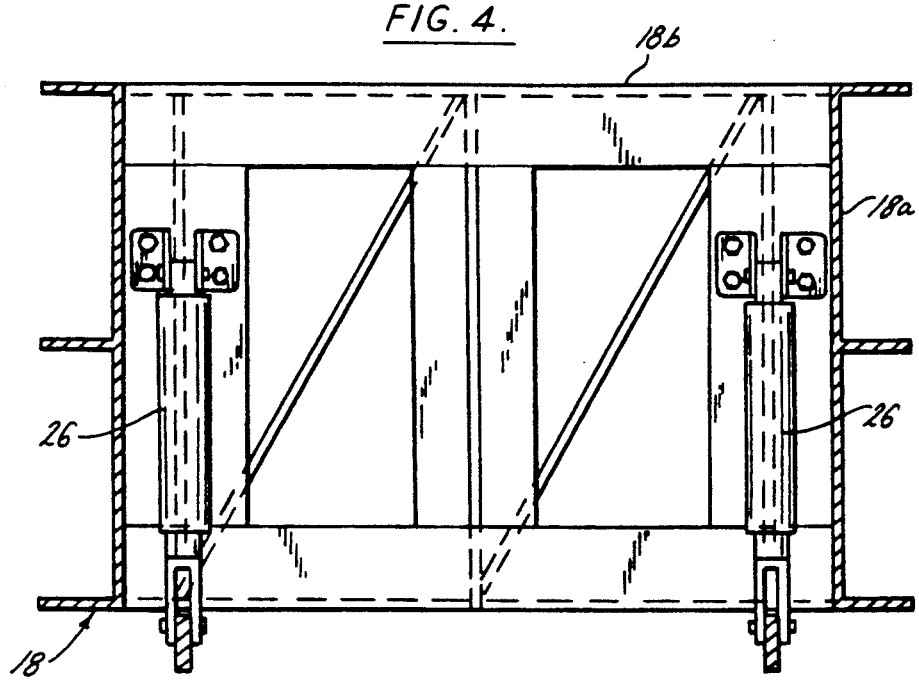
FIG. 4 is a sectional view of the end-effector apparatus of the present invention taken along line 4—4 of FIG. 1.

End-effector apparatus 12 further includes a first pair of single acting air cylinders 22 fixedly attached to frame 18 at side 18a. Air cylinders 22 are used to apply constant force between a guide bushing 23 and template 16 in the direction perpendicular to the longitudinal axis of cutting element 14a independent of the orientation of end-effector apparatus 12. Air cylinders 22 are typically attached to frame 18 perpendicular to the longitudinal axis of cutting element 14a. A second pair of single acting air cylinders 26 is fixedly attached to frame 18, parallel to the longitudinal axis of cutting element 14a, along an inner surface of side 18b as shown in FIGS. 1, 2, and 4. The operation of air cylinders 26 is analogous to the operation of air cylinders 22; however, the function of air cylinders 26 is to apply a constant force between guide bushing 23 and template 16 in the direction parallel to the longitudinal axis of cutting element 14a. In an alternative embodiment of the present invention, air cylinder 22 and air cylinder 26 can each be hydraulically actuated.

The constant forces between guide bushing 23 and template 16, acting perpendicular and parallel to the longitudinal axis of cutting element 14a, and provided by air cylinder 22 and air cylinder 26, respectively, are regulated and controlled by a control system 28 which forms a part of end-effector apparatus 12. Included in control system 28 is a first control circuit and a second control circuit. As shown in FIG. 6, the first and second control circuits each generally consist of an angular measurement sensor 30, a signal conditioning circuit 32, an electronic pressure regulator 34, and their respective pair of single acting air cylinders (air cylinders 22 in the first control circuit, and air cylinders 26 in the second control circuit).

The operation of the first control circuit is carried out in the following manner: angular measurement sensor 30 responds to angular deviations, relative to gravity, of machining device 14 which would affect the gravitational forces along an axis perpendicular to the longitudinal axis of cutting element 14a. Such an angular measurement sensor is a fluid damped pendulum potentiometer. Signal conditioning circuit 32 of the first control circuit receives a voltage value from angular measurement sensor 30 relative to the angular displacement of machining device 14. Signal conditioning circuit 32 thereafter transforms the initial voltage value into a resultant voltage value which is then communicated to electronic pressure regulator 34. Electronic pressure regulator 34 responds to the resultant voltage by correspondingly adjusting the amount of air pressure provided to air cylinder 22. The resultant pressure level provided by pressure regulating circuit 32 is selected so that the force, in a direction perpendicular to the longitudinal axis of cutting element 14a, as provided by the combination of gravitational forces and air cylinder 22, is constant.

The operation of the second control circuit is analogous to that of the first control circuit; however, the second control circuit's function is to measure and respond to angular displacement in directions affecting the gravitational forces along an axis parallel to the longitudinal axis of cutting element 14a. Signal conditioning circuit 32 produces a voltage value, resulting from the voltage value received from angular measurement sensor 30, which directs electronic pressure regulator 34 to adjust the pressure supplied to air cylinder 26. The pressure is adjusted so that air cylinder 26 applies a force in a direction parallel to the longitudinal axis of cutting element 14a such that the sum of the gravitational force and the force from air cylinder 26 remains constant in a direction parallel to the longitudinal axis of cutting element 14a irrespective of the device's orientation with respect to gravity.

It is important to note that although the first and second control circuits consist of the same components, they provide for different directional forces acting on template 16. The first control circuit effectively provides for a constant force acting on template 16 in the direction perpendicular to the longitudinal axis of cutting element 14a independent of the orientation of end-effector apparatus 12 and machining device 14. The second control circuit, although analogous to the first control circuit in operation, is different from the first control circuit in that its function is to provide for a constant force acting on template 16 in the direction parallel to the longitudinal axis of cutting element 14a independent of the orientation of end-effector apparatus 12 and machining device 14. Numerous modifications can be performed on the specifically described control system by those skilled in the art without departing from the scope of the present invention.

Figure 5:
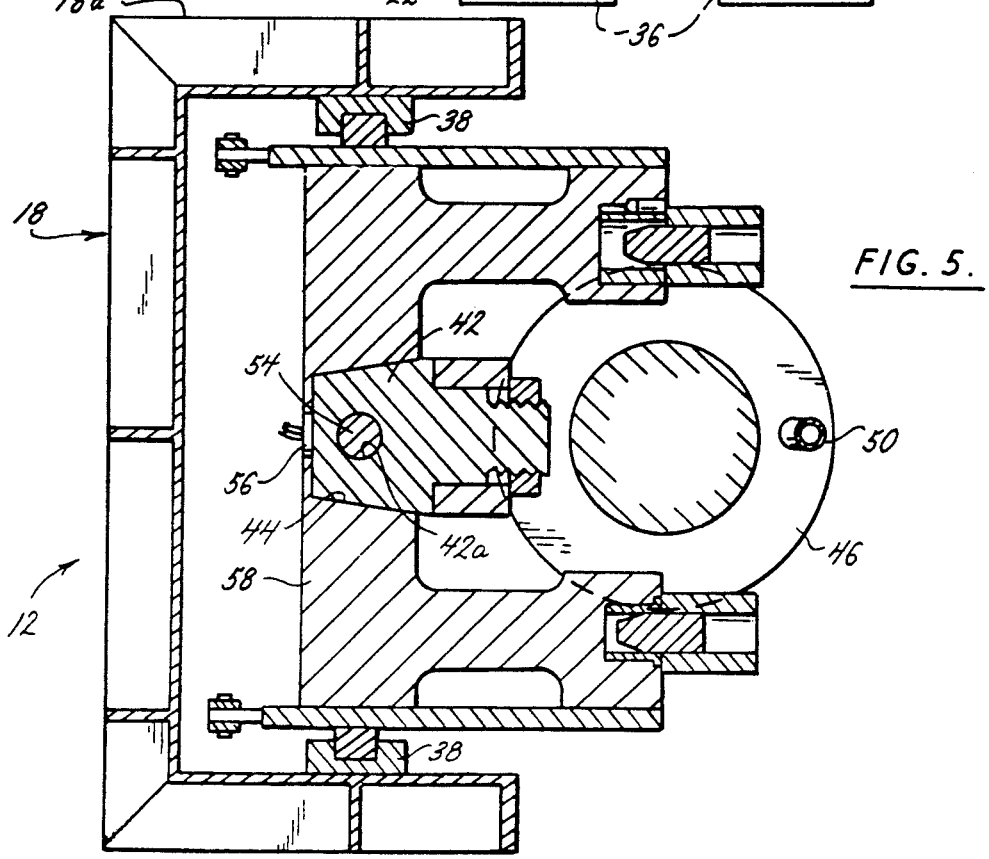
FIG. 5 is a sectional view of the end-effector apparatus of the present invention taken along line 5—5 of FIG. 1.

As shown in FIG. 2, a first pair of linear bearings 36 are included at side 18a of frame 18 perpendicular to the longitudinal axis of cutting element 14a as part of end-effector apparatus 12, as shown in FIG. 2. Linear bearing 36 is used in conjunction with air cylinder 22, thereby providing for the engagement and substantial translational movement of machining device 14, relative to robotic arm 11 and end-effector apparatus 12, in the direction perpendicular to the longitudinal axis of cutting element 14a. Additionally, a second pair of linear bearings 38 are included as part of end-effector apparatus 12 at the inner surface of frame 18 and are fixedly attached parallel to the longitudinal axis of cutting element 14a, as shown in FIGS. 2 and 5. When used in conjunction with each other, air cylinder 26 and linear bearing 38 provide the engagement and substantial translational movement of machining device 14, relative to robotic arm 11 and end-effector apparatus 12, in the direction parallel to the longitudinal axis of cutting element 14a. It should be noted that air cylinder 22 and linear bearing 36 are used simultaneously with air cylinder 26 and linear bearing 38. Therefore, template 16 receives constant force from machining device 14 enabling workpiece 17 to be machined uniformly independent of the orientation of end-effector apparatus 12. Clearly, any number of cylinders and linear bearings can be used to perform the same operation as the air cylinders and linear bearings described heretofore. It should be noted that while the linear bearings allow for substantial translational movement, the pressure resulting from the corresponding air cylinders and gravitational forces urge the bearings to remain in a default position, typically a position approximately in the middle of the bearings' range of motion with such positioning varying due to contour changes of the template and workpiece.

The constant force, substantial two-axis travel of machining device 14 allows cutting element 14a to follow substantial contour changes in workpiece 17. Although robotic arm 11 provides plural axes and angular rotational movement to machining device 14, this movement does not allow cutting element 14a to follow contour changes of workpiece 17 as readily as does end-effector apparatus 12 since contour changes were effected in prior machining devices by increasing the number of spatial coordinates provided to the interfacing computer. The constant force applied by end-effector apparatus 12 provides for a consistently machined part; the use of linear bearings provides for substantial movement in two dimensions to accommodate contour changes while maintaining a consistent force and orientation with respect to template 16. Therefore, end-effector apparatus 12 increases machining efficiency and consistency to the machined edge of workpiece 17.

Figure 3:
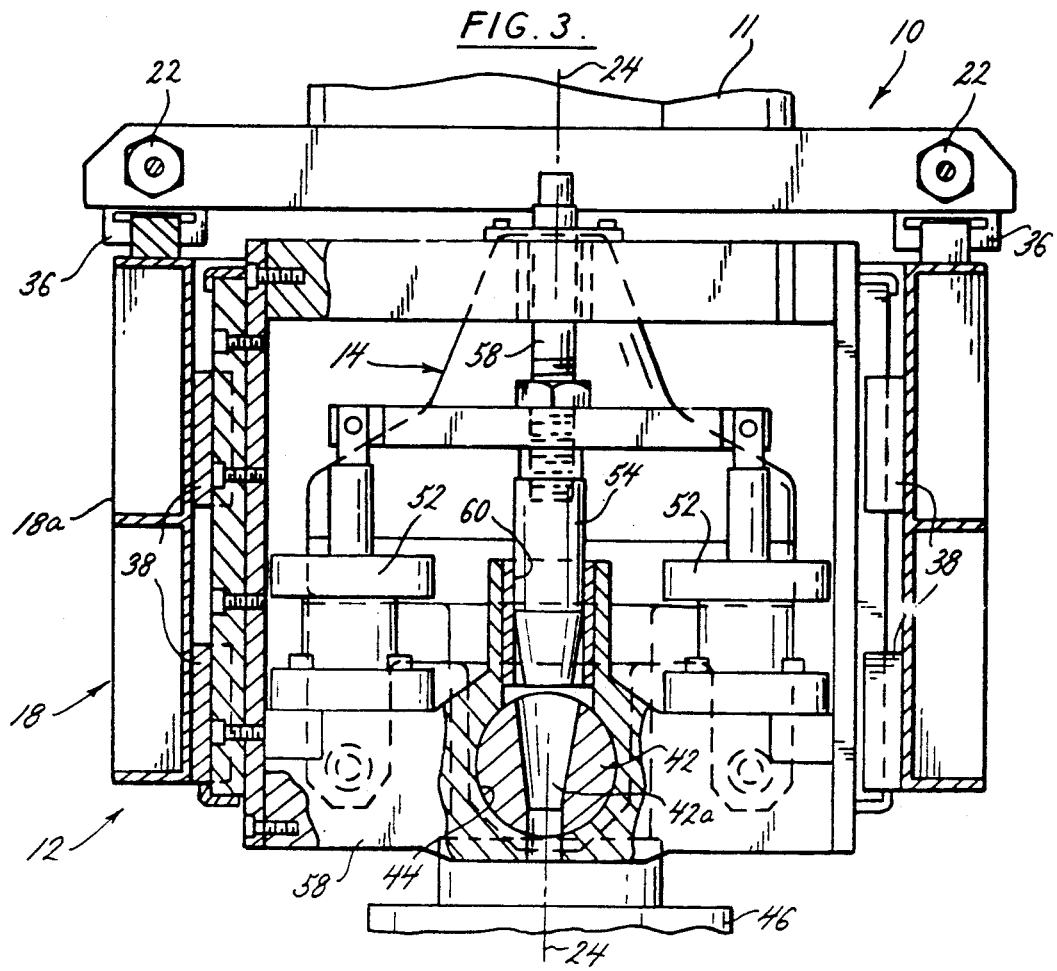
FIG. 3 is a sectional view taken along line 3—3 of FIG. 1.

Referring to FIGS. 1, 3, and 5, machining device 14 includes a manifold 40 which has a tapered knob 42. A tapered aperture 42a, in tapered knob 42, aids in the attachment of machining device 14 within a tapered aperture 44 in end-effector apparatus 12.

Lubrication and air are delivered to cutting element 14a via manifold 40 and nosepiece assembly 46. The air enters manifold 40 following its expulsion, in the form of exhaust, from the machining device motor while the oil is derived from its injection into the compressed air supply of machining device 14 and travels, mixed with the air, through the motor of machining device 14, into manifold 40. Nosepiece assembly 46 has four apertures 48 disposed substantially parallel to the longitudinal axis of cutting element 14a; each aperture is angled inward and toward the surface of workpiece 17. After motor exhaust air and oil exits manifold 40, it travels through a tube 50 into nosepiece assembly 46 and is delivered to the surface of workpiece 17 by aperture 48. The air delivered by aperture 48 effectively cools cutting element 14a and expels any chips from the surface of workpiece 17 while the oil lubricates cutting element 14a.

As shown in FIG. 3, end-effector apparatus 12 further includes a means for receiving machining device 14 and fixedly holding it during operation. Included is a pair of double acting air cylinders 52 for actuating and withdrawing a pin 54. Pin 54 is used for locking machining device 14 within frame 18 of end-effector apparatus 12. A sensor 56 (shown in FIG. 5) is included within tapered aperture 44 of end-effector apparatus 12 to verify when tapered knob 42 of machining device 14 is properly locked within end-effector apparatus 12. Tapered aperture 44 is disposed within a crosspiece 58 perpendicular to the longitudinal axis of cutting element 14a, and an aperture 60 is disposed longitudinally within crosspiece 58, parallel to axis 24. Aperture 60 provides a path of travel for pin 54.

After end-effector apparatus 12 has been fixedly attached to robotic arm 11 and the respective spatial coordinates have been programmed into the interfacing computer, robotic arm 11 moves to a loading/unloading station (not shown) to load machining device 14 within frame 18 of end-effector apparatus 12. Upon positioning of machine device 14 within frame 18, tapered knob 42 is inserted into tapered aperture 44, and double acting air cylinder 52 actuates pin 54. Pin 54 is actuated in a direction parallel to the longitudinal axis of cutting element 14a to extend through aperture 60 of crosspiece 58. As shown in FIG. 1, pin 54 also extends into aperture 42a of tapered knob 42 and therefore locks machining device 14 within end-effector apparatus 12. Following actuation of pin 54, sensor 56 checks to verify that machining device 14 is properly locked within end-effector apparatus 12.

Next, robotic machining apparatus 10 moves in position to machine workpiece 17 and thereafter begins machining operation. During operation, single acting air cylinders 22 and single acting air cylinders 26 provide forces between guide bushing 23 and template 16 perpendicular and parallel to the longitudinal axis of cutting element 14a, respectively, which, when summed with gravitational forces, is constant irrespective of orientation with respect to gravity. This constant force is regulated and adjusted by control system 28 according to the orientation of end-effector apparatus 12.

Linear bearings 36 and air cylinders 22 are used in conjunction with linear bearings 38 and air cylinders 26 to provide cutting element 14a of machining device 14 freedom to follow substantial contour changes of template 16 and workpiece 17. By using control system 28, adjustments can be continually performed to assure optimum machining and maintainability of machining device 14.

Upon completion of machining operation, robotic arm 11 moves the entire machining apparatus, i.e., machining device 14 and end-effector apparatus 12, to the loading/unloading station to unload machining device 14. When the machining apparatus is in correct unloading position, double acting air cylinder 52 retracts pin 54 and unlocks machining device 14 from frame 18 of end-effector apparatus 12. Next, robotic arm 11 disengages, leaving machining device 14 at the loading/unloading station.

Those skilled in the art can carry out changes and modifications to the specifically described embodiments without departing from the scope or spirit of the present invention which is intended to be limited only by the scope of the appended claims.

What is claimed is:

1. In combination with both a machining device, having a cutting element, and a robotic arm, an end-effector apparatus for use in template-guided machining of a workpiece, comprising:
    (a) means, when said end-effector apparatus is in any orientation, for holding a guide bushing of said machining device against said template with constant force;
    (b) first means for translational movement of said machining device substantially along an axis perpendicular to the longitudinal axis of said cutting element, such that said cutting element follows the contour changes along the periphery of said workpiece; and
    (c) second means for translational movement of said machining device substantially along an axis parallel to the longitudinal axis of said cutting element, such that said cutting element follows the contour changes along the periphery of said workpiece.

2. The end-effector apparatus as recited in claim 1, wherein said holding means comprises:
    (a) first pressure application means, wherein said first pressure application means provides a force which, in combination with gravitational force, provides a constant force along said axis perpendicular to said longitudinal axis of said cutting element;
    (b) second pressure application means, wherein said second pressure application means provides a force which, in combination with gravitational force, provides a constant force along said axis parallel to said longitudinal axis of said cutting element;

(c) first means for controlling the amount of pressure supplied by said first pressure application means; and (d) second means for controlling the amount of pressure supplied by said second pressure application means.

3. The end-effector apparatus as recited in claim 2, wherein said first pressure application means is a first pair of single acting air cylinders and wherein said second pressure application means is a second pair of single acting air cylinders.

4. The end-effector apparatus as recited in claim 2, wherein said first controlling means comprises:

(a) angular measurement means for producing a first signal, wherein said first signal is responsive to angular deviation, relative to gravity, of said machining device;

(b) a signal conditioning circuit for receiving said first signal from said angular measurement means and converting said first signal into a second signal; and (c) first pressure regulating means, responsive to said second signal of said signal conditioning circuit, for controlling the amount of pressure supplied by said first pressure application means.

5. The end-effector apparatus as recited in claim 2, wherein said second controlling means comprises:

(a) angular measurement means for producing a first signal, wherein said first signal is responsive to angular deviation, relative to gravity, of said machining device;

(b) a signal conditioning circuit for receiving said first signal from said angular measurement means and converting said first signal into a second signal; and (c) first pressure regulating means, responsive to said second signal of said signal conditioning circuit, for controlling the amount of pressure supplied by said second pressure application means.

6. The end-effector apparatus as recited in claim 4, wherein said angular measurement means is a fluid damped pendulum potentiometer.

7. The end-effector apparatus as recited in claim 4, wherein said pressure regulating means is an electronic pressure regulator.

8. The end-effector apparatus as recited in claim 5, wherein said angular measurement means is a fluid damped pendulum potentiometer.

9. The end-effector apparatus as recited in claim 5, wherein said pressure regulating means is an electronic pressure regulator.

10. The end-effector apparatus as recited in claim 1, wherein said first movement means is a first pair of linear bearings, and wherein each linear bearing of the pair comprises:

(a) a track for travel; and (b) a plurality of ball bearings enclosed by said track.

11. The end-effector apparatus as recited in claim 1, wherein said second movement means is a second pair of linear bearings, and wherein each linear bearing of the pair comprises:

(a) a track for travel; and (b) a plurality of ball bearings enclosed by said track.

12. In combination with both a machining device, having a cutting element, and a robotic arm, an end-effector apparatus for use in template-guided machining of a workpiece, comprising:

(a) a first pair of single acting air cylinders for providing a force against the edge of said template along an axis perpendicular to the longitudinal axis of said cutting element;

(b) a first control means, comprising:

(1) a fluid damped pendulum potentiometer for producing a first signal, wherein said first signal is responsive to angular deviation, relative to gravity, of said machining device;

(2) a signal conditioning circuit for receiving said first signal from said angular measurement means and converting said first signal into a second signal;

(3) an electronic pressure regulator, responsive to said second signal of said signal conditioning circuit, for controlling the amount of pressure supplied by said first pair of single acting air cylinders such that in combination with gravitational forces the pressure applied along an axis perpendicular to the longitudinal axis of said cutting element is constant irrespective of the orientation of said machining device with respect to gravity;

(c) a second pair of single acting air cylinders for providing a force against the edge of said template along an axis parallel to the longitudinal axis of said cutting element;

(d) a second control means, comprising:

(1) a fluid damped pendulum potentiometer for producing a first signal, wherein said first signal is responsive to angular deviation, relative to gravity, of said machining device;

(2) a signal conditioning circuit for receiving said first signal from said angular measurement means and converting said first signal into a second signal;

(3) an electronic pressure regulator, responsive to said second signal of said signal conditioning circuit, for controlling the amount of pressure supplied by said second pair of single acting air cylinders such that in combination with gravitational forces the pressure applied along an axis parallel to the longitudinal axis of said cutting element is constant irrespective of the orientation of said machining device with respect to gravity;

(e) a first means for translational movement, comprising:

(1) a track for travel which allows said machining device substantial movement along said axis perpendicular to the longitudinal axis of said cutting such that said cutting element follows contour changes along the periphery of said template; and (2) a plurality of ball bearings enclosed by said track; and (f) a second travel means, comprising:

(1) a track for travel which allows said machining device substantial movement along said axis parallel to the longitudinal axis of said cutting element such that said cutting element follows contour changes along the periphery of said template; and (2) a plurality of ball bearings enclosed by said track.

* * * * *